Patented Jan. 18, 1927.

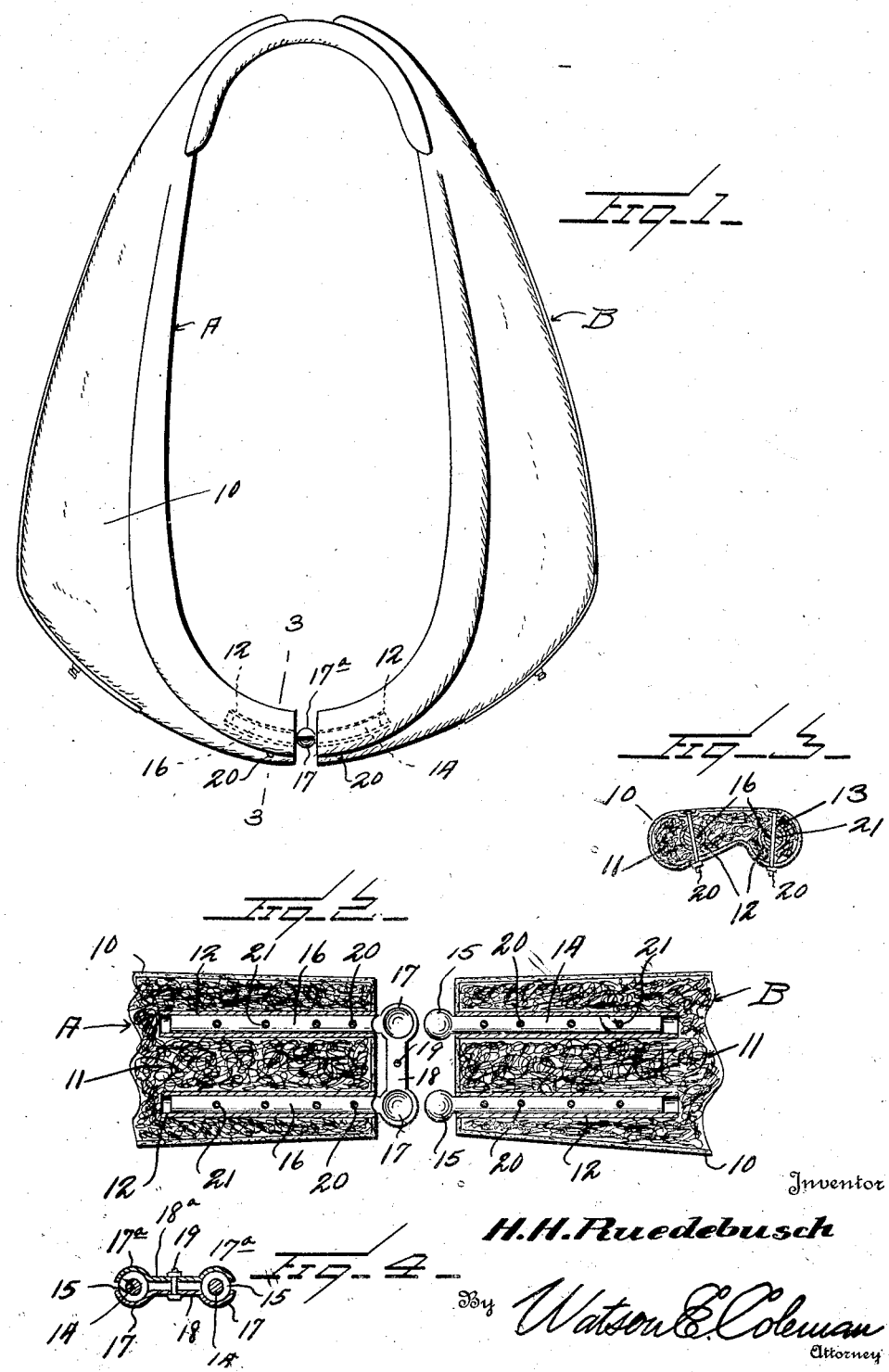

1,614,995

UNITED STATES PATENT OFFICE.

HERMAN H. RUEDEBUSCH, OF ELKTON, SOUTH DAKOTA.

FASTENER FOR HORSE COLLARS.

Original application filed March 18, 1926, Serial No. 95,734. Divided and this application filed July 20, 1926. Serial No. 123,724.

This invention relates to horse collars and particularly to pneumatic collars such as are illustrated in my pending application for patent Serial No. 95,734, filed on March 18, 1926, of which the present application is division.

The general object of the present invention is to form a horse collar of two sections adjustable toward or from each other at their lower ends and provide members acting as hinges for the two sections so that the collar will not be liable to break at the lower end which ordinary collars often do, due to the bending of the collar to open it in order to put the collar on or take it off.

A further object is to provide a connecting member or hinge for the lower ends of the two sections of the collar which consists of two members, one for each section of the collar, said members being adjustable longitudinally so that the collar may be adjustable at its lower end to fit the horse's neck.

Other objects will appear in the course of the following description.

My invention is illustrated in the accompanying drawings wherein:—

Figure 1 is an elevation of a horse collar constructed in accordance with my invention;

Fig. 2 is a horizontal sectional view through the lower ends of the two sections of the collar;

Fig. 3 is a section on the line 3—3 of Figure 1;

Fig. 4 is a perspective section through the ball and socket joint between the collar sections.

Referring to these drawings it will be seen that the collar, which as before remarked is preferably a pneumatic collar, is formed in two sections A and B. The collar consists of an outer casing 10, stuffed at its lower end with horse hair or any other suitable stuffing material designated 11. Disposed within each section of the collar at its lower end are one or more tubular members 12 opening upon the end face of the collar section, these tubular members being transversely perforated as at 13.

Coacting with the tubular members on one side of the collar are one or more rods 14 which are preferably longitudinally curved to conform to the shape of the lower end of the collar as shown in Figure 1, each of these rods 14 terminating in a globular head 15. Coacting with the tubular members on the opposite section of the collar are one or more rods 16 likewise longitudinally curved and formed at their outer ends with half sockets 17, these sockets being joined by a cross bar 18. The globular heads 15 are adapted to rest in these sockets and are held in place by a cross piece 18$^a$ having semi-globular sockets at their ends which confront the sockets 17. The cross bars 18 and 18$^a$ are connected by means of a bolt 19. By removing the bolt the two sections can be very readily disengaged from each other and by tightening up on the bolt, the heads 15 may be held in snug engagement with the respective sockets. Bolts 20 pass through the walls of the casing 10 through the tubular members 12 and through perforations 21 in the rods 14 and 16, as shown in Figure 3, thus holding the rods adjusted. By removing these bolts and shifting the rods outward or inward, any desired adjustment of the two collar sections with relation to each other may be secured.

It will be seen that I have provided a collar which can be made either wider or narrower according to different conditions. The ordinary horse collar which is adjustable at the top only never can be properly adjusted so as to fit under all circumstances. Inasmuch as the two sections of the collar are in effect hinged at their lower ends, all liability of breakage at this point is eliminated.

While I have illustrated a construction which I believe to be particularly effective I do not wish to be limited thereto as it is obvious that many changes might be made therein without departing from the spirit of the invention as defined in the appended claims.

While I have illustrated two ball and socket joints for the collar sections, it is obvious that one might be used within the scope of my invention.

I claim:—

1. A horse collar composed of two sections, each of said sections at its lower end having a plurality of axially extending rods, the rods of one section being provided at their outer ends with globular heads, the other rods being provided with semi-spherical head receiving sockets, and a member having complementary semi-spherical sockets adapted to be clamped upon the heads of the last named rods.

2. A horse collar formed in two sections, the lower ends of the sections being formed with tubular members transversely apertured at a plurality of points, rods disposed in said tubular members and longitudinally shiftable therein, and having transverse apertures adapted to align with the apertures in the corresponding tubular member, and bolts insertible through said apertures, the rod of one member having swiveled detachable engagement with the rod of the other member.

In testimony whereof I hereunto affix my signature.

HERMAN H. RUEDEBUSCH.